United States Patent [19]

Winkelblech

[11] 4,324,317

[45] Apr. 13, 1982

[54] ELEVATOR DEVICE

[76] Inventor: Dean R. Winkelblech, Aaronsburg, Pa. 16820

[21] Appl. No.: 115,713

[22] Filed: Jan. 28, 1980

[51] Int. Cl.³ ............................................. B66B 11/04
[52] U.S. Cl. .................................... 187/25; 187/9 R; 280/163
[58] Field of Search ........................... 187/9 R, 24, 25; 280/163, 166; 414/DIG. 921; 254/98, 100, 85, 7 R, 81 R, 83, 84; 248/125, 157

[56] References Cited

U.S. PATENT DOCUMENTS

| 2,884,225 | 4/1959 | Ford | 254/98 |
| 3,392,959 | 7/1968 | Lewis | 187/24 |
| 3,981,484 | 9/1976 | James | 414/DIG. 921 |
| 4,026,387 | 5/1977 | Abreu | 187/24 |
| 4,133,437 | 1/1979 | Gates | 414/DIG. 921 |
| 4,145,066 | 3/1979 | Shearin | 280/166 |

Primary Examiner—Robert J. Spar
Assistant Examiner—Kenneth Noland
Attorney, Agent, or Firm—Thomas E. Sterling

[57] ABSTRACT

This invention is an electrically powered elevator comprised of a hollow support member through which a screw passes. A reversible electric motor rotates the screw. A support nut attached to a platform engages the screw and an electrical control system attached to the platform allows a person standing on the platform to be raised or lowered by the rotation of the screw.

7 Claims, 12 Drawing Figures

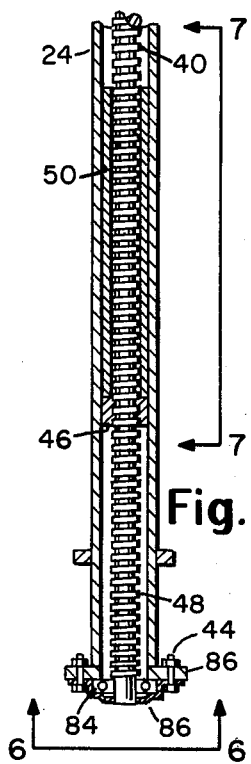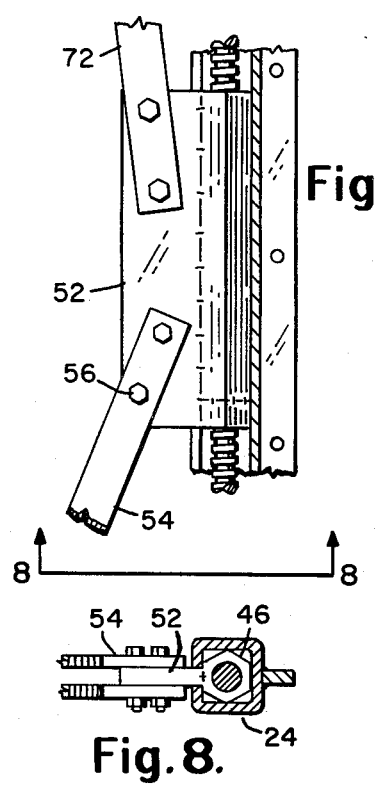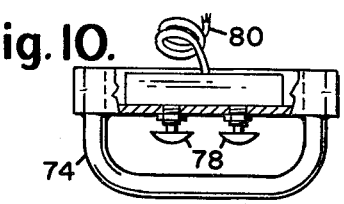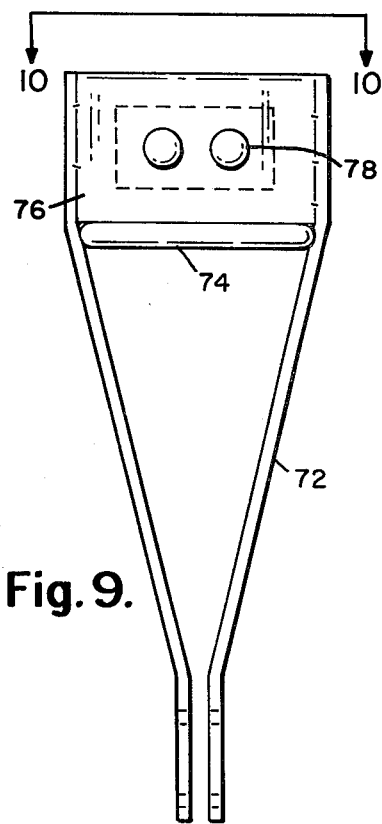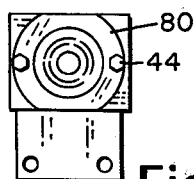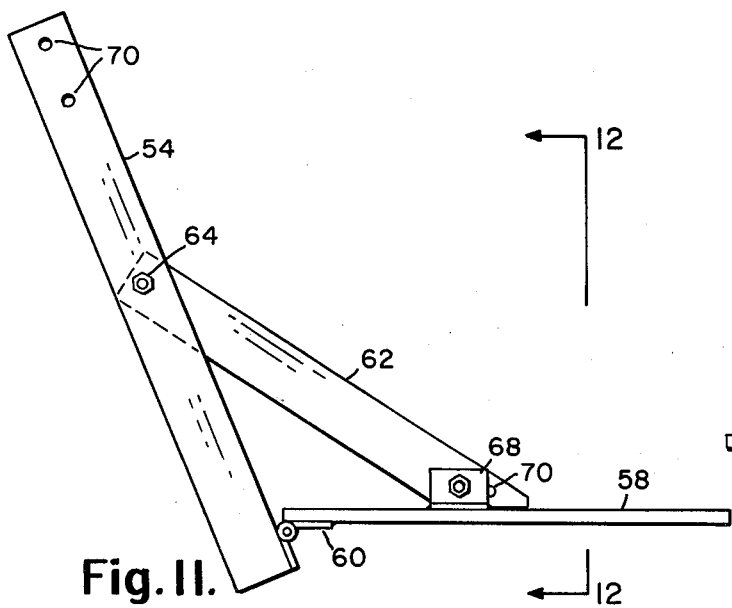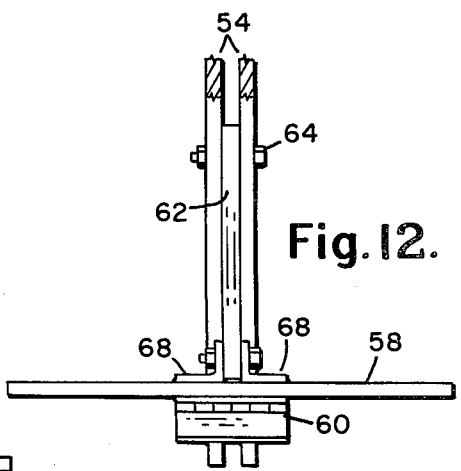

ELEVATOR DEVICE

This invention relates to elevators and in particular to elevators used to lift persons on to elevated equipment.

Many pieces of equipment require that the operator climb great vertical distances in order to get to the operating position thereon. This is particularly true of large trucks, agricultural equipment such as combines, harvesters, picking equipment and alike. It is usually necessary for the operator to climb a precarious ladder mounted on the side of the equipment to get to the driving position or cab. Often, these climbing ladders are dangerous, offering insufficient hand holes and foot holes, and in general are a hazzard and an annoyance for the operator.

It is the purpose of this invention to provide an elevator or lift which will safely and easily transport the equipment operator from the ground level to the operating or cab level of his device and transport him down again when he has finished using the device.

This invention is an elevator or lift powered by a 12 volt or other capacity storage battery, which is utilized on the equipment itself. Generally speaking, the invention is comprised of a platform screwably attached to a long vertical screw which is rotated by an electric motor connected to the equipment storage battery. Control buttons are attached to hand grips, also connected to the screw, pressing of which will activate the electric motor causing the screw to rotate and to raise or lower the platform. The operator then steps upon the platform, grips the hand grips and presses a button and is lifted up to the control level of the equipment. When he is finished, he steps upon the platform, presses the "DOWN" button and is safely and efficiently lowered to the ground level.

The inventor knows of no prior art anticipating this invention. The inventor is not withholding known prior art which he considers anticipates this invention.

An object of this invention is, therefore, to provide a device which will lift a person to an elevated position and lower him therefrom.

Another object of this invention is to provide a screw activated elevator powered by an equipment housed storage battery.

Still another object of this invention is to provide a simple, safe and efficient lift device, whereby an operator may be lifted or lowered.

Yet another object of this invention is to provide a lifting device which is readily attachable to equipment to allow an operator to be raised to an appropriate level.

Still another object of this invention is to provide an elevator that may be easily attached to farm equipment to allow an operator to be raised to the control cab.

Other objects and novel features of construction will appear from the following description taken in conjunction with the accompanying drawings in it.

FIG. 5 is a cross-sectional view of the sleeve portion of the device taken along line 5—5 of FIG. 2.

FIG. 6 is a bottom view of the sleeve portion of the device taken along line 6—6 of FIG. 5.

FIG. 7 is a side view of the sleeve portion of the device taken along line 7—7 of FIG. 5.

FIG. 8 is a bottom view partially in section of the sleeve portion of the device taken along line 8—8 of FIG. 7.

FIG. 9 is a front view of the hand grip portion of the device.

FIG. 10 is a top view of the hand grip portion of the device taken along line 10—10 of FIG. 9.

FIG. 11 is a side view of the platform of the device.

FIG. 12 is a front view of the platform of the device taken along line 12—12 of FIG. 11.

Figure 1:
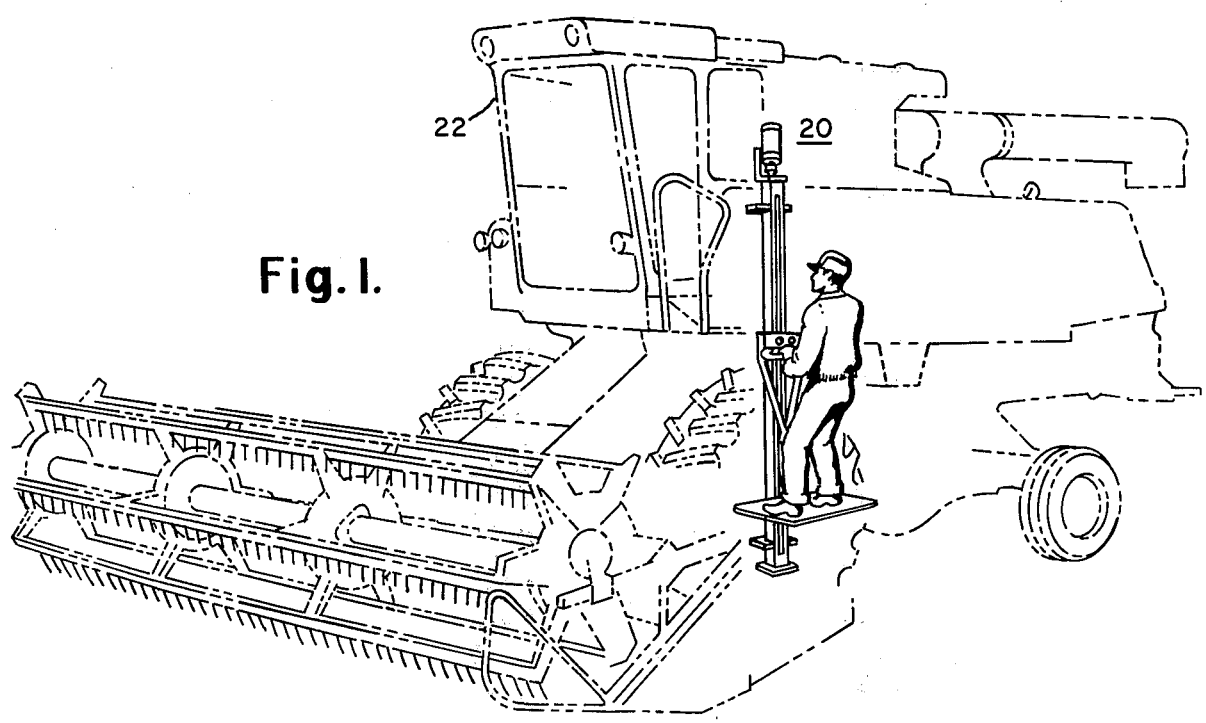
FIG. 1 is a third dimensional view of the elevator device mounted on an agricultural threshing machine (in phantom view) with an operator positioned thereon.
Figure 2:
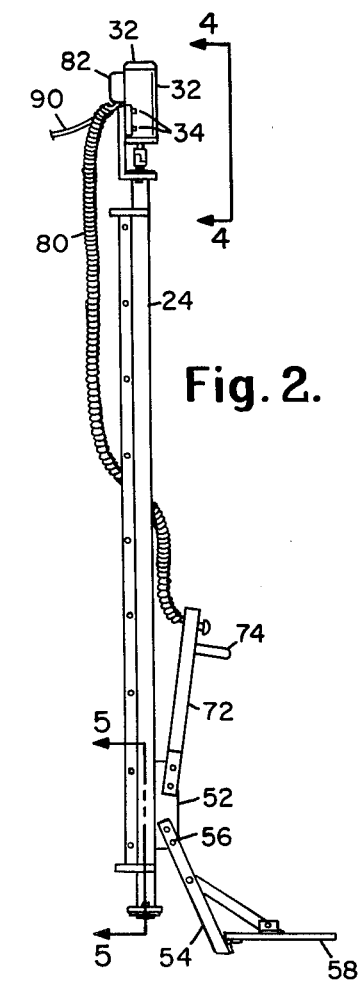
FIG. 2 is a side view of the device.
Figure 3:
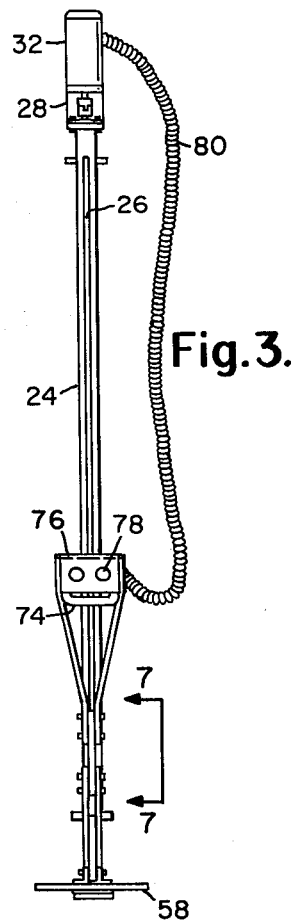
FIG. 3 is a front view of the device of FIG. 2.
Figure 4:
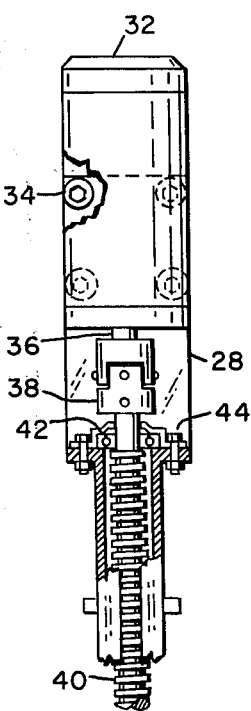
FIG. 4 is a front view of the device taken along line 4—4 of FIG. 2 showing the electric motor and screw coupling.

Referring now to the drawings and in particular to FIG. 1, 20 represents the elevator invention positioned upon an agricultural combine 22. A vertically positioned support member 24 having a forwardly positioned vertical slot 26 therein is attached to "L" shaped motor bracket 28 by means of bolts 30. Support member 24 is essentially a hollow cylinder having approximately a square cross section. Electric motor 32 is secured to motor bracket 28 by means of motor bolts 34. The shaft 36 of electric motor 32 is attached to coupling 38. The opposite end portion of said coupling 38 is attached to screw 40 which extends vertically within support member 24. The coupling 38 is comprised of a "U" shaped shaft member attached to the motor and a "T" shaped screw member attached to the screw 40. Two pins extend through both shafts, a screw member coupling them together. Screw 40 extends through upper screw bearing 42 attached to the upper portion of support member 24 (means of bearing bolts 44).

Referring now to FIG. 5, nut 46 positioned within support member 24 engages screw 48. Rectangular shaped inner slide 50 is attached to nut 46 and encases screw 48. Inner slide 50 is in sliding contact with the interior portion of support member 24 and will slide upward or downward within support member 24.

Inner slide plate 52 is welded to inner slide 50 and through slot 26 in support member 24. Platform support member 54 is attached to inner slide plate 52 by means of platform adjustment bolts 56. A platform 58 is rotatably attached to the lower portion of platform support member 54 by means of platform hinge 60. A platform adjustment member 62 is rotatably attached to the midportion platform support member 54 by means of bolt 64. The other end portion of platform adjustment 62 is attached to the "L" shaped brackets 68 which are welded to platform 58. Platform adjustment member 62 has adjustment holes 70 therein, permitting the angle of platform 58 to be adjusted.

The upper portion of inner slide plate 52 is bolted to hand grip supports 72, the upper portion of which is integrally attached to "U" shaped hand grip 74. A control box 76 is attached to the upper portion of hand grip supports 72. Control buttons 78 are positioned in control box 76, the pressing of which activates motor 32. A spiral control cable 80 is connected to control box 76 and leads a relay box 82 electrically connected to the motor 32. A power cable 90 attached to a storage battery (not shown) is connected to the relay box 82. Pressing of a control button 78 activates relay box 82 which connects power cable 90 to the motor 32 causing it to turn screw 48.

The bottom support member 24 has attached thereto a lower bearing 84 through which the bottom portion of screw 40 passes. Lower bearing 84 is bolted to a support member flange 86 which is integrally attached to the bottom of member 24 by means of a lower bearing plate 88.

In operation, an operator steps on platform 58 and presses the "UP" control button 78 which activates relay 82. Then a power cable 90 with motor 32 causes it to turn screw 40. Nut 46 is thereby raised by rotating screw 40 carrying with it platform 38.

When the platform reaches the desired level, the operator releases button 78 causing motor 32 to stop. The operator then steps from the platform onto the control area of his equipment. When the operator wishes to leave, the reverse of this process occurs. The operator presses the "DOWN" button 78 which causes the screw 40 to turn in the opposite direction, lowering the platform 38.

I claim:

1. An elevator device adapted for attachment to a substantially upright surface comprising in combination:
    a hollow support member attached to said upright surface;
    an electric motor attached to said support member;
    a screw rotatably coupled to said electric motor and extending within said support member;
    a support nut rotatably engaged with said screw;
    an inner slide connected to said support nut and in sliding contact with the interior surface of said hollow support member;
    a platform member attached to said inner slide, said platform member comprising in combination:
        a platform support member attached to said inner slide;
        a platform adjusting member rotatably attached to the middle portion of said platform support member;
        a platform rotatably attached to said platform adjustment member, said platform being rotatably hinged to said platform support member;
    a hand grip member attached to said inner slide;
    a dual button attached to said hand grip member;
    an electrical conduit extending from said dual button device to said electric motor and adapted to rotate said electric motor in both a clockwise and counterclockwise direction upon the activation of said dual button.

2. The combination as claimed in claim 1 in which said hand grip member is comprised of, in combination:
    a hand grip support member attached to said inner slide;
    a hand grip attached to said hand grip support member;
    a button control box attached to said hand grip support member.

3. The combination as claimed in claim 2 in which said button control box is connected to a relay, said relay electrically connected to said electric motor.

4. The combination as claimed in claim 3 in which a lower bearing is positioned in the bottom portion of said support member and in contact with said screw.

5. The combination as claimed in claim 4 in which an inner slide plate is attached to said inner slide, said inner slide plate being coupled to said platform support member.

6. The combination as claimed in claim 5 in which the shaft of said electric motor is attached to a coupling, said coupling being attached to said screw.

7. The combination as claimed in claim 6 in which a battery power source is connected to said relay, said battery power source being electrically connected to said motor when activated by said button control box.

* * * * *